(12) United States Patent
Reddy et al.

(10) Patent No.: US 9,602,821 B2
(45) Date of Patent: Mar. 21, 2017

(54) SLICE ORDERING FOR VIDEO ENCODING

(75) Inventors: Harikrishna M. Reddy, San Jose, CA (US); Yiu Cheong Ho, Fremont, CA (US); Cheng-Chiang Chen, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 677 days.

(21) Appl. No.: 12/243,885

(22) Filed: Oct. 1, 2008

(65) Prior Publication Data

US 2010/0080304 A1    Apr. 1, 2010

(51) Int. Cl.
*H04N 7/12* (2006.01)
*H04N 19/129* (2014.01)
*H04N 19/61* (2014.01)

(52) U.S. Cl.
CPC .......... *H04N 19/129* (2014.11); *H04N 19/61* (2014.11)

(58) Field of Classification Search
None
See application file for complete search history.

(56) References Cited

U.S. PATENT DOCUMENTS

| | | | |
|---|---|---|---|
| 5,481,297 A * | 1/1996 | Cash et al. | 348/14.12 |
| 5,585,931 A | 12/1996 | Juri et al. | |
| 5,818,529 A | 10/1998 | Asamura et al. | |
| 5,969,750 A | 10/1999 | Hsieh et al. | |
| 5,990,812 A | 11/1999 | Bakhmutsky | |
| 6,507,614 B1 | 1/2003 | Li | |
| 6,654,539 B1 | 11/2003 | Duruoz et al. | |
| 7,092,442 B2 | 8/2006 | Zhang et al. | |
| 7,167,520 B2 | 1/2007 | Yoshioka et al. | |
| 7,206,456 B2 | 4/2007 | Hannuksela et al. | |
| 7,535,961 B2 | 5/2009 | Cho et al. | |
| 7,672,377 B2 * | 3/2010 | Heng et al. | 375/240.16 |
| 7,796,692 B1 | 9/2010 | Falardeau et al. | |
| 7,932,843 B2 * | 4/2011 | Demircin et al. | 341/107 |
| 2002/0064228 A1 | 5/2002 | Sethuraman et al. | |
| 2002/0143835 A1 | 10/2002 | Kechriotis | |
| 2003/0120691 A1 | 6/2003 | Nakayama | |
| 2003/0128756 A1 | 7/2003 | Oktem | |
| 2003/0142105 A1 | 7/2003 | Lavelle et al. | |
| 2003/0156652 A1 | 8/2003 | Wise et al. | |
| 2003/0179706 A1 | 9/2003 | Goetzinger et al. | |

(Continued)

OTHER PUBLICATIONS

16×16 macroblock partition size prediction for H.264 P slices; Jongmin You; Wonkyun Kim; Jechang Jeong; Consumer Electronics, IEEE Transactions on; vol. 52, Issue: 4; Publication Year: 2006, pp. 1377-1383.*

(Continued)

*Primary Examiner* — David Y Jung

(57) ABSTRACT

For encoding, a frame of video data can be segregated into macroblocks, which can be segregated into slices, which in turn can be segregated into slice groups. A macroblock identifier (ID) can be associated with each of the macroblocks. When at least one slice from each of the slice groups has been encoded, the macroblock IDs associated with the encoded slices can be compared to determine an order in which the encoded slices are to be placed in an access unit for the frame. Of the encoded slices, the slice that includes the macroblock with the lowest macroblock ID will be placed in the access unit before the other encoded slices.

20 Claims, 5 Drawing Sheets

| | ENCODER WRITE | C1 VALUE | C2 VALUE | C3 VALUE | DB1 CONTENTS | DB2 CONTENTS | DB3 CONTENTS | LINK LIST WRITE | FRAME ASSEMBLER READ | ACCESS UNIT CONTENTS |
|---|---|---|---|---|---|---|---|---|---|---|
| T1 | A1(0) to DB1 | 0 | 0 | 0 | A1(0) | -- | -- | -- | -- | -- |
| T2 | A1(1) to DB1 | 0 | 0 | 0 | A1(0), A1(1) | -- | -- | -- | -- | -- |
| T3 | A1(2) to DB1 | 1 | 0 | 0 | A1(0), A1(1), A1(2) | -- | -- | A1 to LL1 | -- | -- |
| T4 | A2(3) to DB1 | 1 | 0 | 0 | A1(0), A1(1), A1(2), A2(3) | -- | -- | -- | -- | -- |
| T5 | B1(4) to DB2 | 1 | 0 | 0 | A1(0), A1(1), A1(2), A2(3) | B1(4) | -- | -- | -- | -- |
| T6 | B1(5) to DB2 | 1 | 0 | 0 | A1(0), A1(1), A1(2), A2(3) | B1(4), B1(5) | -- | -- | -- | -- |
| T7 | B1(6) to DB2 | 1 | 1 | 0 | A1(0), A1(1), A1(2), A2(3) | B1(4), B1(5), B1(6) | -- | B1 to LL2 | -- | -- |
| T8 | A2(7) to DB1 | 1 | 1 | 0 | A1(0), A1(1), A1(2), A2(3), A2(7) | B1(4), B1(5), B1(6) | -- | -- | -- | -- |
| T9 | A2(8) to DB1 | 1 | 1 | 0 | A1(0), A1(1), A1(2), A2(3), A2(7), A2(8) | B1(4), B1(5), B1(6) | -- | -- | -- | -- |
| T10 | A2(9) to DB1 | 1 | 1 | 0 | A1(0), A1(1), A1(2), A2(3), A2(7), A2(8), A2(9) | B1(4), B1(5), B1(6) | -- | -- | -- | -- |
| T11 | C1(10) to DB3 | 1 | 1 | 1 | A1(0), A1(1), A1(2), A2(3), A2(7), A2(8), A2(9) | B1(4), B1(5), B1(6) | C1(10) | C1 to LL3 | A1 | A1 |
| T12 | C2(11) to DB3 | 0 | 1 | 1 | A2(3), A2(7), A2(8), A2(9) | B1(4), B1(5), B1(6) | C1(10), C2(11) | -- | -- | A1 |
| T13 | C2(12) to DB3 | 0 | 1 | 2 | A2(3), A2(7), A2(8), A2(9) | B1(4), B1(5), B1(6) | C1(10), C2(11), C2(12) | C2 to LL3 | -- | A1 |

(56) References Cited

U.S. PATENT DOCUMENTS

| | | | |
|---|---|---|---|
| 2004/0067043 | A1 | 4/2004 | Duruoz et al. |
| 2004/0179619 | A1* | 9/2004 | Tian et al. ............... 375/240.26 |
| 2004/0218626 | A1 | 11/2004 | Tyldesley et al. |
| 2005/0024487 | A1 | 2/2005 | Chen |
| 2005/0207497 | A1 | 9/2005 | Rovati et al. |
| 2006/0083306 | A1 | 4/2006 | Hsu |
| 2006/0115002 | A1 | 6/2006 | Kim et al. |
| 2006/0177142 | A1 | 8/2006 | Zhou |
| 2006/0227874 | A1 | 10/2006 | Tongle et al. |
| 2007/0006060 | A1 | 1/2007 | Walker |
| 2007/0036225 | A1 | 2/2007 | Srinivasan et al. |
| 2008/0003447 | A1 | 1/2008 | Nee |
| 2008/0056350 | A1 | 3/2008 | Lyashevsky et al. |
| 2008/0123750 | A1 | 5/2008 | Bronstein et al. |
| 2008/0152245 | A1 | 6/2008 | El-Maleh et al. |
| 2008/0219576 | A1 | 9/2008 | Jung et al. |
| 2008/0232463 | A1 | 9/2008 | Lu et al. |
| 2008/0253463 | A1 | 10/2008 | Lin et al. |
| 2008/0298473 | A1 | 12/2008 | Gou |
| 2009/0067507 | A1* | 3/2009 | Baird et al. |
| 2009/0304085 | A1 | 12/2009 | Avadhanam et al. |
| 2010/0254620 | A1* | 10/2010 | Iwahashi et al. ............. 382/233 |

OTHER PUBLICATIONS

A New Rate Control Algorithm for H.264; Ping Xu; Peihua Fu; Weidong Xu; Shaofang Zou; Yingle Fan; Integration Technology, 2007. ICIT '07. IEEE International Conference on Publication Year: 2007, pp. 574-578.*

Joint Flexible Macroblock Ordering and FEC Coding for H.264 Wireless Video Transmission; Aramvith, S.; Hantanong, W.; Intelligent Signal Processing and Communications, 2006. ISPACS '06. International Symposium on Publication Year: 2006, pp. 139-142.*

University of Oslo Department of Informatics; Investigating Host-Device communication in a GPU-based H.264 encoder; Master thesis; Kristoffer Egil; Bonarjee; May 16, 2012.*

Motion Estimation for H.264/AVC on Multiple GPUs Using NVIDIA CUDA; Bart Pieters et al.; Applications of Digital Image Processing XXXII, edited by Andrew G. Tescher, Proc. of SPIE vol. 7443, 74430X • © 2009 SPIE; year 2009.*

Flexible macroblock ordering as a content adaptation tool in H.264/AVC; Yves Dhondt; Multimedia Systems and Applications VIII, Proc. of SPIE vol. 6015, 601506, (2005); year 2005.*

Deblocking filter—Wikipedia, the free encyclopedia; printed out year 2012.*

Cheng et al., "An In-Place Architecture for Deblocking Filter in H.264/AVC", IEEE Transactions on Circuits and Systems-II: Express Briefs, vol. 53, No. 7, Jul. 2006.

Schoffmann et al., "An Evaluation of Aprallelization Concepts for Baseline-Profile Compliant H.264/AVC Decoders", Euro-Par 2007, LNCS4641, pp. 782-791, 2007.

Chen et al., "Archetecture Design of H.264/AVC Decoder With Hybrid Task Pipelinig for High Definition Videos", DSP/IC Design Lab, Graduate Institute of Electronics Engineering and Department of Electrical Engineering National Taiwan University, Taipei Taiwan, 2005 IEEE.

Huang et a., "Archetecture Design for Deblocking Filter in K264/JVT/AVC", Department of Electrical Engineering National Taiwan University, Taipei Taiwan, 2003 IEEE.

* cited by examiner

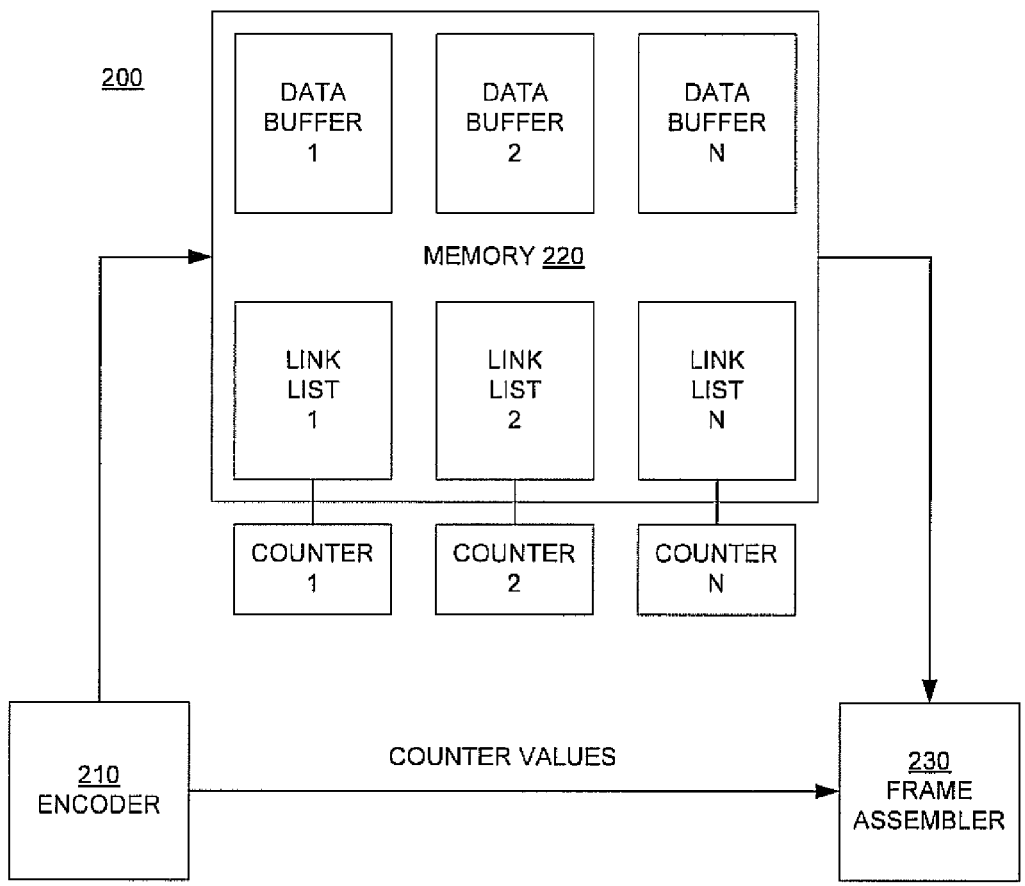

| 300 | A1 (0) | A1 (1) | A1 (2) | A2 (3) |
|---|---|---|---|---|
| MACROBLOCK → | B1 (4) | B1 (5) | B1 (6) | A2 (7) |
| MACROBLOCK ID → | A2 (8) | A2 (9) | C1 (10) | C2 (11) |
| | C2 (12) | A2 (13) | A3 (14) | A3 (15) |

| NAL_Type | SG_Act | 4'b0 | First mbnum in slice | Last slice in SG | Frame_number | Pktbitcnt | | |
|---|---|---|---|---|---|---|---|---|
| End_frame | Frame_type | New_frame | Video_mode | Stream_ID | Stream_type | 15'b0 | Timestamp | |

FIG. 5

| | ENCODER WRITE | C1 VALUE | C2 VALUE | C3 VALUE | DB1 CONTENTS | DB2 CONTENTS | DB3 CONTENTS | LINK LIST WRITE | FRAME ASSEMBLER READ | ACCESS UNIT CONTENTS |
|---|---|---|---|---|---|---|---|---|---|---|
| T1 | A1(0) to DB1 | 0 | 0 | 0 | A1(0) | — | — | — | — | — |
| T2 | A1(1) to DB1 | 0 | 0 | 0 | A1(0), A1(1) | — | — | — | — | — |
| T3 | A1(2) to DB1 | 1 | 0 | 0 | A1(0), A1(1), A1(2) | — | — | A1 to LL1 | — | — |
| T4 | A2(3) to DB1 | 1 | 0 | 0 | A1(0), A1(1), A1(2), A2(3) | — | — | — | — | — |
| T5 | B1(4) to DB2 | 1 | 0 | 0 | A1(0), A1(1), A1(2), A2(3) | B1(4) | — | — | — | — |
| T6 | B1(5) to DB2 | 1 | 1 | 0 | A1(0), A1(1), A1(2), A2(3) | B1(4), B1(5) | — | B1 to LL2 | — | — |
| T7 | B1(6) to DB2 | 1 | 1 | 0 | A1(0), A1(1), A1(2), A2(3) | B1(4), B1(5), B1(6) | — | — | — | — |
| T8 | A2(7) to DB1 | 1 | 1 | 0 | A1(0), A1(1), A1(2), A2(3), A2(7) | B1(4), B1(5), B1(6) | — | — | — | — |
| T9 | A2(8) to DB1 | 1 | 1 | 0 | A1(0), A1(1), A1(2), A2(3), A2(7), A2(8) | B1(4), B1(5), B1(6) | — | — | — | — |
| T10 | A2(9) to DB1 | 1 | 1 | 0 | A1(0), A1(1), A1(2), A2(3), A2(7), A2(8), A2(9) | B1(4), B1(5), B1(6) | — | — | — | — |
| T11 | C1(10) to DB3 | 1 | 1 | 1 | A1(0), A1(1), A1(2), A2(3), A2(7), A2(8), A2(9) | B1(4), B1(5), B1(6) | C1(10) | C1 to LL3 | A1 | A1 |
| T12 | C2(11) to DB3 | 0 | 1 | 1 | A2(3), A2(7), A2(8), A2(9) | B1(4), B1(5), B1(6) | C1(10), C2(11) | — | — | A1 |
| T13 | C2(12) to DB3 | 0 | 1 | 2 | A2(3), A2(7), A2(8), A2(9) | B1(4), B1(5), B1(6) | C1(10), C2(11), C2(12) | C2 to LL3 | — | A1 |

FIG. 4A

| | ENCODER WRITE | C1 VALUE | C2 VALUE | C3 VALUE | DB1 CONTENTS | DB2 CONTENTS | DB3 CONTENTS | LINK LIST WRITE | FRAME ASSEMBLER READ | ACCESS UNIT CONTENTS |
|---|---|---|---|---|---|---|---|---|---|---|
| T14 | A2(13) to DB1 | 1 | 1 | 2 | A2(3), A2(7), A2(8), A2(9), A2(13) | B1(4), B1(5), B1(6) | C1(10), C2(11), C2(12) | A2 to LL1 | A2 | A1, A2 |
| T15 | A3(14) to DB1 | 0 | 1 | 2 | A3(14) | B1(4), B1(5), B1(6) | C1(10), C2(11), C2(12) | — | — | A1, A2 |
| T16 | A3(15) to DB1 | 1 | 1 | 2 | A3(14), A3(15) | B1(4), B1(5), B1(6) | C1(10), C2(11), C2(12) | A3 to LL1 | B1 | A1, A2, B1 |
| T17 | — | 1 | 0 | 2 | A3(14), A3(15) | — | C1(10), C2(11), C2(12) | — | C1 | A1, A2, B1, C1 |
| T18 | — | 1 | 0 | 1 | A3(14), A3(15) | — | C2(11), C2(12) | — | C2 | A1, A2, B1, C1, C2 |
| T19 | — | 1 | 0 | 0 | A3(14), A3(15) | — | — | — | A3 | A1, A2, B1, C1, C2, A3 |
| T20 | — | 0 | 0 | 0 | — | — | — | — | — | A1, A2, B1, C1, C2, A3 |

FIG. 4B

SLICE ORDERING FOR VIDEO ENCODING

FIELD

Embodiments according to the present invention generally relate to video encoding (video compression).

BACKGROUND

H.264, also known as Moving Pictures Experts Group-4 (MPEG-4) Part 10 or MPEG-4 Advanced Video Coding (AVC), is a standard for video compression. A video includes a series of pictures (or frames), with each frame consisting of a two-dimensional array of pixels. The pixels are divided into macroblocks (a 16×16 array of pixels). Each macroblock has a macroblock number; in general, the macroblocks are numbered starting at the top-left of the frame, in increasing order from left-to-right and top-to-bottom. The macroblocks can be grouped into slices, and the slices can be grouped into slice groups. Macroblocks within a slice are arranged in ascending order by macroblock number. A slice can include any number of macroblocks, which may or may not be contiguous; that is, macroblocks in one slice may be interspersed among macroblocks of one or more other slices of other slice groups—macroblocks from slices in the same slice group are not interspersed with each other. The feature of H.264 that allows macroblocks to be grouped into slices as just described is generally referred to as flexible macroblock ordering (FMO).

FMO is one of the error resiliency tools that can be used by a decoder to conceal errors if slices are lost or corrupted during transmission. Macroblocks in a missing or corrupted slice can be reconstructed by interpolating or extrapolating macroblock information from another slice. More specifically, a correctly received slice can be decoded, and the information in that slice can be used to derive information for another slice.

Another H.264 feature is generally referred to as arbitrary slice ordering (ASO). With ASO, slices can be transmitted in any order. For example, a slice may be sent as soon as it is ready—that is, a slice may be streamed to a decoder as soon as all of the macroblocks that make up that slice are encoded. As a result, a slice from one slice group may be sent, followed by a slice from another slice group, followed by another slice from the first slice group, and so on.

Unfortunately, ASO places additional burdens on decoders, making their implementation more complicated. In the example of FIG. 1, in order to decode macroblock M1, information may be needed for macroblock M2 (the nearest neighbor on the left of macroblock M1) and perhaps for macroblock M3 (the nearest neighbor above macroblock M1). However, macroblock M1 may be in one slice (e.g., slice S2) and the neighboring macroblocks M2 and M3 may be parts of a different slice (e.g., slice S1) or slices. With ASO enabled, slice S2 may be sent to the decoder before slice S1. Subsequently, macroblock M1 may be ready for decoding, but that decoding may have to be delayed if slice S1 has not yet arrived at the decoder. As a result, slice S2 will be stored at the decoder until slice S1 arrives.

In general, because of ASO, decoders need to have the memory capacity to store slices of encoded data until other slices needed for decoding are available. Furthermore, decoders need to have the processing capability to sort through the stored slices and arrange them as needed for decoding.

SUMMARY

According to embodiments of the present invention, slices can be encoded in any order but are not necessarily sent in the order in which they are encoded.

In one embodiment, slices of macroblocks are stitched together to form an access unit for a frame of video data, and a macroblock identifier (ID) is associated with each macroblock in the frame. In such an embodiment, the order in which the slices are placed in the access unit is based on the increasing order of the first (or lowest) macroblock ID in each slice. For example, when at least one slice from each slice group has been encoded, the macroblock IDs associated with the encoded slices can be compared to determine an order in which the encoded slices are to be placed in the access unit. That is, in one embodiment, each time the subset of encoded slices includes at least one slice from each slice group, the slice that includes the macroblock with the lowest macroblock ID can be placed in the access unit before other encoded slices in the subset. As will be seen from the discussion to come, even if the slices are encoded in arbitrary order, and even if the slices include non-contiguous macroblocks per FMO, the slices will be delivered to a decoder in an ordered fashion. As a result, information that may be needed to decode a particular macroblock will be available when that macroblock is scheduled for decoding.

Significantly, embodiments of the present invention can be implemented using current encoder architectures—it is not necessary to modify encoder hardware in order to implement these embodiments. From the encoder's point of view, encoding can occur as if ASO is being implemented—it is not necessary to encode slices in any particular order. Instead, encoded slices are shuffled before they leave the encoder so that they are received at a decoder in an orderly manner. As a result, decoding can be performed more efficiently, and decoder architectures and/or decoding processes can be simplified because they do not have to support ASO.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

FIG. 1 illustrates an array of macroblocks.

FIG. 2 is a block diagram of an embodiment of a system for encoding data according to the present invention.

FIG. 3 illustrates a mapping of macroblocks to slices and slice groups according to one embodiment of the present invention.

FIGS. 4A and 4B illustrate a sequence in which slices are processed according to an embodiment of the present invention.

FIG. 5 illustrates an entry in a link list that includes information about encoded data according to one embodiment of the present invention.

DETAILED DESCRIPTION

Figure 6:
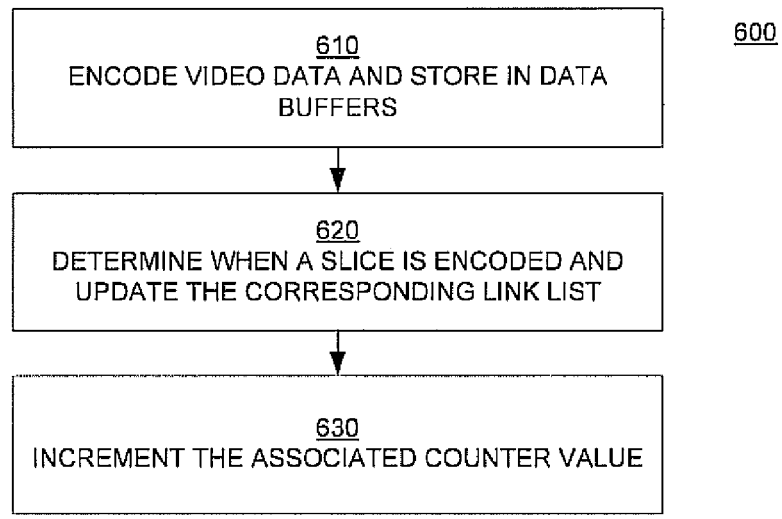
FIG. 6 is a flowchart of one embodiment of a computer-implemented method for processing data.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "encoding," "identifying," "performing," "comparing," "segregating," "storing," "sorting," "initializing," "incrementing," "placing," "ordering," "accessing," "accumulating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. The term "incrementing" may be used to mean a positive or negative change to a value; that is, the value is changed by an incremental amount.

Embodiments of the invention described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

FIG. 2 is a block diagram of an embodiment of a system 200 for encoding data according to the present invention. In the example of FIG. 2, the encoding system includes an encoder 210, a memory 220, and a frame assembler 230. In one embodiment, the memory includes a number of data buffers 1, 2, . . . , N. Not all data buffers may be used for any given frame; each frame may use a different number of data buffers. In general, the number of data buffers used for a frame corresponds to the number of slice groups in the frame. In one embodiment, in accordance with the H.264 video standard, there may be up to eight slice groups, and thus there are eight data buffers (N=8).

According to embodiments of the invention, each data buffer is associated with a respective link list 1, 2, . . . , N. In the example of FIG. 2, the data buffers are used to hold data encoded by the encoder, and the link lists contain entries related to the encoded data. Additional information about the contents of a link list is provided below (see FIG. 5). A link list may be implemented as a buffer, but a link list need not be a persistent data structure. For example, a link list for data buffer N may exist (may be active) only if that data buffer contains data. In general, the number of active link lists is equal to the number of buffers that contain data; if N=8, then there may be up to 8 active link lists.

It is not necessary that the data buffers and the link lists reside in the same memory device. Also, the encoder and the frame assembler may be implemented in hardware as separate devices or within a single device. The encoder and frame assembler can be properly viewed as separate stages in a data processing pipeline.

In one embodiment, a counter is associated with each data buffer. Alternatively, a counter may be associated with each link list. As another alternative, a counter may be associated with each slice group. The role of the counters is described below, in conjunction with FIGS. 4A and 4B.

Continuing with reference to FIG. 2, in one embodiment, the encoder is an H.264 encoder. H.264 may also be known as MPEG-4 Part 10 or MPEG-4 AVC. In general, the encoder encodes (compresses) frames of image data (video data). According to H.264, each video or picture frame is divided into macroblocks (e.g., a 16×16 array of pixels), which are grouped into slices, which in turn are grouped into slice groups. A slice can include any number of macroblocks, which may or may not be contiguous; that is, macroblocks in one slice may be interspersed between macroblocks of another slice.

The frame assembler stitches slices of macroblocks to form an access unit for a frame of video data. Each access unit includes encoded video data for the frame as well as related information that may be needed by the decoding device; such information is known in the art. Each access unit can be stored by the encoding device or by another device; if stored, the access units can be subsequently retrieved and streamed (transmitted) to a decoding device. Alternatively, each access unit can be sent directly to a decoding device.

In general, some type of macroblock identifier (ID) is associated with each macroblock. Each macroblock ID is unique within a frame; that is, each macroblock in a frame can be uniquely identified by its macroblock ID. The macroblocks in a frame are generally arrayed in rows and columns. Encoding is generally performed starting with the macroblock in the first row and first column (that is, starting at the left end of the top row), and proceeding in order from left-to-right and top-to-bottom. The macroblock IDs coincide with the encoding order; for example, the macroblocks may be numbered in the order in which they are encoded, as shown in the example of FIG. 3.

According to embodiments of the present invention, the order in which encoded slices are placed in the access unit is based on the increasing order of the first (or lowest) macroblock ID in each encoded slice. For example, if there are two encoded slices, then the lowest macroblock ID in the first slice is compared to the lowest macroblock ID in the second slice, and the slice that contains the macroblock with the lower macroblock ID is placed in the access unit first. More precisely, in one embodiment, each time the subset of encoded slices includes at least one slice from each slice group, the macroblock IDs associated with the encoded slices are compared to determine which of the encoded slices is to be placed in the access unit ahead of the others. Within the subset of encoded slices, the slice that includes the macroblock with the lowest macroblock ID is placed in the access unit before other encoded slices. As encoding proceeds, all of the slices in a particular slice group may have been encoded and placed in the access unit, in which case the subset of encoded slices does not have to include a slice from that particular slice group in order to perform the comparison of macroblock IDs. In other words, once all of the slices in a particular slice group have been placed in an access unit, that slice group is removed from consideration, and only the macroblock IDs associated with slices in other (remaining) slice groups are included in the comparison. This procedure is described in greater detail in conjunction with FIGS. 3 and 4.

FIG. 3 illustrates a mapping of macroblocks to slices and slice groups according to one embodiment of the present invention. In the example of FIG. 3, the slice group map 300 includes a four-by-four array of 16 macroblocks (a 64×64 pixel array), with three slice groups A, B and C, and six slices A1, A2, A3, B1, C1 and C2. FIG. 3 represents only a portion of a frame of video data; in general, a frame includes many more macroblocks, there may be some number of slice groups other than the three, and some number of slices other than six. Slices A1, A2 and A3 are in slice group A, slice B1 is in slice group B, and slices C1 and C2 are in slice group C. The slice group map can be established prior to encoding so the information in the map is available to the encoder. The slice group map is also included in the frame header so it can be provided to the decoder.

As mentioned above, a macroblock ID (e.g., a macroblock number) is assigned to each macroblock in the frame. The macroblock IDs correspond to the order in which the macroblocks are processed (encoded). In the example of FIG. 3, the encoder processes the macroblocks in left-to-right, top-to-bottom order and so the macroblock IDs increase from left to right and from top to bottom (where left, right, top and bottom refer to the orientation of the frame in FIG. 3). Slice A1 includes macroblocks 0, 1 and 2; slice A2 includes macroblocks 3, 7, 8, 9 and 13; slice A3 includes macroblocks 14 and 15; slice B1 includes macroblocks 4, 5 and 6; slice C1 includes macroblock 10; and slice C2 includes macroblocks 11 and 12.

FIGS. 4A and 4B illustrate the sequence in which slices are processed according to an embodiment of the present invention. The sequence includes a number of time steps T1 through T20; those time steps are not necessarily separated by equal intervals nor do they necessarily correspond to consecutive clock cycles. FIGS. 4A and 4B are described in conjunction with the examples of FIGS. 2 and 3.

In one embodiment, slices that are members of the same slice group are placed in the same data buffer after encoding. In such an embodiment, encoded slice group A (encoded slices A1, A2 and A3) is placed in data buffer 1; encoded slice group B (encoded slice B1) is placed in data buffer 2; and encoded slice group C (encoded slices C1 and C2) is placed in data buffer N (N=3 in this example). Such an approach can simplify the tracking of slices and slice groups in the encoder; however, the present invention is not so limited. As noted above, the slice group map is established in advance of the encoding and thus it can be used to identify when all macroblocks in a slice have been encoded and stored in a data buffer.

In the example of FIG. 3, the macroblocks in the frame are accessed and encoded starting at the upper left and proceeding to the bottom right. At T1, macroblock 0 (which is in slice A1) is encoded and added to data buffer (DB) 1; none of the counters is incremented unless otherwise noted. At T2, macroblock 1 (slice A1) is encoded and added to data buffer 1. At T3, macroblock 2 (slice A1) is encoded and added to data buffer 1. At this point, because all of the macroblocks in slice A1 have been encoded and buffered, link list (LL) 1 (the link list associated with data buffer 1) is updated with information related to slice A1 (see FIG. 5 for link list details). Also, because all of the macroblocks in slice A1 have been encoded and buffered, counter (C) 1 (which is associated with data buffer 1 or, equivalently, with slice group A or link list 1) is increased by a one-count increment. However, even though the encoding of slice A1 is complete, slice A1 is not placed in the access unit for the frame because a slice from each slice group has not yet been encoded (the subset of encoded slices does not include a slice from slice group B or from slice group C).

At T4, macroblock 3 (slice A2) is encoded and added to data buffer 1; however, neither link list 1 nor counter 1 is updated because encoding of slice A2 is not yet completed. At T5 through T7, macroblocks 4-6 (slice B1) are encoded and added to data buffer 2. At this point, because all of the macroblocks in slice B1 have been encoded and buffered, link list 2 (the link list associated with data buffer 2) is updated with information related to slice B1. Also, counter 2 (which is associated with data buffer 2 or, equivalently, with slice group B or link list 2) is increased by a one-count increment. However, even though the encoding of slice B1 is complete, slice B1 is not placed in the access unit for the frame because a slice from each slice group has not yet been encoded (the subset of encoded slices does not include a slice from slice group C).

At T8 through T10, macroblocks 7-9 (slice A2) are encoded and added to data buffer 1; however, neither link list 1 nor counter 1 is updated because encoding of slice A2 is still not yet completed. At T11, macroblock 10 (slice C1) is encoded and added to data buffer 3. At this point, because all of the macroblocks in slice C1 have been encoded and buffered, link list 3 (the link list associated with data buffer 3) is updated with information related to slice C1. Also, counter 3 (which is associated with data buffer 3 or, equivalently, with slice group C or link list 3) is increased by a one-count increment.

At this point, each of the data buffers contains at least one completely encoded slice. Equivalently, at least one slice per slice group has been completely encoded, or each counter has a value other than its initial value (in this example, each counter has a non-zero value). Any of these indicators can be relied upon to trigger the step of placing of an encoded slice into the access unit for the frame.

To identify which of the encoded slices A1, B1 and C1 will be placed into the access unit, the encoded slice that contains the lowest macroblock ID is determined, and that slice will be placed into the access unit before the other encoded slices. More specifically, as shown in FIG. 5, one of the items included in each link list is the macroblock ID for the first macroblock (e.g., the left-most and/or upper-most macroblock) in each slice. The macroblock IDs in the first active link list for each slice group can be compared to identify the lowest macroblock ID in the link lists. Thus, the link lists can be used to identify the lowest macroblock ID per encoded slice (that is, the lowest macroblock ID amongst the slices A1, B1 and C1 stored in the data buffers). The encoded slice that includes the macroblock with the lowest macroblock ID in the link lists is selected and placed in the access unit ahead of the others.

In the example of FIGS. 3 and 4, among the subset of completely encoded slices stored in the data buffers, slice A1 includes the macroblock with the lowest macroblock ID—slice A1 includes macroblock 0. Thus, slice A1 will be placed into the access unit first; slice A1 can be placed into the access unit at this time or at a later time, depending on the implementation. Link list 1 can be updated—the entry for slice A1 can be removed from that link list. Alternatively, a pointer can be moved to the next entry in the link list (if there is one). Correspondingly, counter 1 is decreased by a one-count increment. At this point, all of the data buffers no longer contain at least one slice each, or there is no longer at least one encoded slice per slice group, or not all of the counters have a value other than their initial values, and so no other slices are placed in the access unit.

At T12 and T13, macroblocks 11-12 (slice C2) are encoded and added to data buffer 3. At this point, because all of the macroblocks in slice C2 have been encoded and buffered, link list 3 (the link list associated with data buffer 3) is updated with information related to slice C2. Also, counter 3 is increased by a one-count increment. However, because none of the aforementioned indicators are satisfied (e.g., there is not at least one encoded slice per slice group), a slice is not added to the access unit.

At T14, macroblock 13 (slice A2) is encoded and added to data buffer 1. This is the last macroblock in slice A2, and therefore link list 1 is updated with information related to slice A2, and counter 1 is increased by a one-count increment. At this point, the data buffers again contain at least one completely encoded slice each, meaning that another encoded slice can be selected and placed into the access unit for the frame. To identify which of the encoded slices A2, B1 and C1 will be placed into the access unit before the others, the lowest macroblock ID amongst those slices is identified. In the example of FIGS. 3 and 4, slice A2 includes the macroblock with the lowest macroblock ID—the lowest macroblock ID in slice A2 is 3, the lowest macroblock ID in slice B1 is 4, and the lowest macroblock ID in slice C1 is 10. Thus, slice A2 will be placed in the access unit behind slice A1, either at this point in the process or later, depending on the implementation. Correspondingly, counter 1 is decreased by a one-count increment. Again, because none of the aforementioned triggering conditions are now satisfied, no other slices are selected for placement in the access unit.

At T15 and T16, macroblocks 14-15 (slice A3) are encoded and added to data buffer 1. At this point, because all of the macroblocks in slice A3 have been encoded and buffered, link list 1 is updated with information related to slice A3. Also, counter 1 is increased by a one-count increment. At this point, the data buffers again contain at least one completely encoded slice each, meaning that another encoded slice can be selected and placed into the access unit for the frame. To identify which of the encoded slices A3, B1 and C1 will be placed into the access unit before the others, the lowest macroblock ID amongst those slices is identified. In the example of FIGS. 3 and 4, slice B1 includes the macroblock with the lowest macroblock ID—the lowest macroblock ID in slice A3 is 14, the lowest macroblock ID in slice B1 is 4, and the lowest macroblock ID in slice C1. Thus, slice B1 will be placed in the access unit behind slices A1 and A2. Correspondingly, counter 2 is decreased by a one-count increment.

In the example of FIGS. 3 and 4, at T16, all of the macroblocks and slices in the frame have been encoded. Accordingly, it is no longer necessary for each data buffer to contain an encoded slice in order to trigger further placement of slices into the access unit. Instead, the macroblock IDs for the remaining slices (those not yet placed into the access unit) are compared to identify which slice has the lowest macroblock ID associated therewith. Of the remaining slices, the slice containing the lowest macroblock ID will be the next to be placed in the access unit. In the example of FIGS. 3 and 4, slice C1 includes the macroblock with the lowest macroblock ID—the lowest macroblock ID in slice A3 is 14, and the lowest macroblock ID in slice C1 is 10. Thus, at T17, slice C1 will be placed in the access unit behind slices A1, A2 and B1 and counter 3 is decreased by a one-count increment. In a similar manner, at T18, slice C2 will be placed behind slice C1 and, at T19, slice A3 will be placed behind slice C2. In general, the process continues until a position in the access unit for all of the slices in the buffers is determined.

Per conventional arbitrary slice ordering (ASO), if the slices were placed into the access unit in the order in which they were encoded, then the slices in the example of FIG. 3 would be sent in the following order: A1, B1, C1, C2, A2 and A3; significantly, slice A2 is sent after slices B1 and C1. That order could be problematic, because the information in slice A2 may be relied upon to decode the information in slices B1 and C1. However, according to embodiments of the present invention, the slices in the example of FIG. 3 would be sent in the following order: A1, A2, B1, C1, C2, and A3; thus, slice A2 is available to decode slices B1 and C1. In effect, ASO is disabled but the order in which slices (macroblocks) are encoded is not impacted; that is, flexible macroblock ordering (FMO) is still permitted.

From the point of view of the encoding device (specifically, the encoder 210 of FIG. 2), macroblock encoding proceeds as if ASO was enabled. The ordering of macroblocks in the access unit takes place downstream of the encoder portion of the pipeline. The encoder is effectively decoupled from the access unit assembly portion of the pipeline (that is, from the frame assembler), allowing the encoder to run at full efficiency. In other words, although slices may not be packed into the access unit in the order in which they are encoded, encoder performance is not affected. Encoded data is sent to the data buffers, and information about the encoded data is sent to the link lists; the only information that may be passed directly from the encoder to the frame assembler is the number of entries per data buffer/link list (e.g., the counter values).

FIG. 5 illustrates an entry 500 in a link list according to one embodiment of the present invention. According to embodiments of the invention, there is one link list entry per encoded slice—a link list can contain more than one entry. An entry for a slice is added to the appropriate link list (the link list for the slice group that contains the slice) once the slice is encoded. When a slice is placed into an access unit, the entry for that slice can be removed from the link list, or a pointer can advance to the next entry in the link list (if there is one).

In general, the link lists contain the information (other than the encoded data itself) used by the frame assembler to stitch the encoded slices into an access unit to form a non-ASO frame. The link lists may include other information that passes through the frame assembler on its way to the decoder—the link lists may include information used by the decoder but not needed by the frame assembler. A link list entry may contain information other than that described below, and information may be arranged in an order different from that described below.

In the example of FIG. 5, each link list entry is 128 bits in length; however, the present invention is not so limited. In this example, the first four bits ("NAL_Type") of the entry identify the type of network abstraction layer (NAL). In an embodiment in which there may be up to eight slice groups (e.g., per H.264), the next three bits ("SG_Act") identify the number of active slice groups—for example, if the bit values are 000, then only one slice group is in use; if the bit values are 001, then only two slice groups are in use, and so on. The next four bits are set to zero, and the next 13 bits ("First mbnum in slice") identify the first macroblock number (the lowest macroblock ID) in the slice associated with the particular link list entry. Thus, in the example of FIG. 3, the macroblock ID in the link list entry for slice A1 would be the binary equivalent of zero, while the macroblock ID in the link list entry for slice A2 would be the binary equivalent of three.

The next bit ("Last slice in SG") is set if the link list entry is associated with the last slice in the slice group. Thus, in the example of FIG. 3, this bit would be set for the link list entries associated with slices A3, B1 and C2.

Continuing with reference to FIG. 5, the next 16 bits ("Frame_number") in the entry identify the frame number, and the next 23 bits ("Pktbitcnt") identify the number of bits in the slice. The next bit ("End_frame") can be set to indicate the end of the frame, the next two bits ("Frame_type") identify the type of frame (e.g., I, P or B), followed by another bit ("New_frame") that identifies whether this slice is the first slice of the frame, followed by four bits ("Video_mode") that identify the encoding standard (e.g., H.264). Next are eight bits ("Stream_ID") that identify the video stream (multiple streams may be encoded in parallel by the encoding system), a bit ("Stream_type") that identifies the type of stream (e.g., NAL or byte stream), 15 bits that are set to zero, and a 32-bit time stamp.

Figure 7:
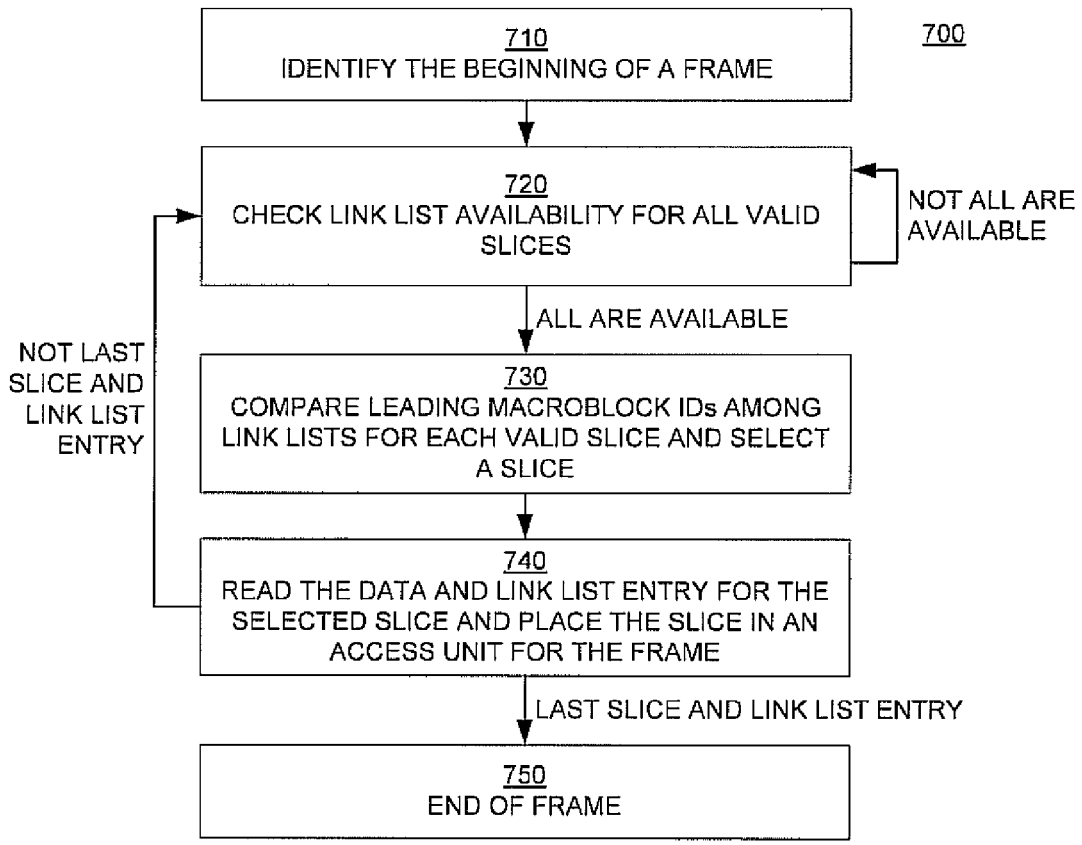
FIG. 7 is a flowchart of one embodiment of a computer-implemented method for processing data.

FIG. 6 is a flowchart 600 of an example of a computer-implemented method for processing data in one embodiment of the present invention. FIG. 7 is a flowchart 700 of an example of a computer-implemented method for processing data according to another embodiment of the present invention. Although specific steps are disclosed in the flowcharts, such steps are exemplary. That is, embodiments of the present invention are well-suited to performing various other steps or variations of the steps recited in the flowcharts. The flowcharts can be implemented as computer-executable instructions stored in a computer-readable medium. In one embodiment, the flowchart of FIG. 6 is implemented by the encoding system of FIG. 2, and the flowchart of FIG. 7 is implemented by the frame assembler of FIG. 2.

With reference now to FIG. 6, in block 610, macroblocks comprising video data are encoded and the encoded data is accumulated in a number of data buffers. In one embodiment, the number of slice groups in the frame is identified, and the encoded data is sorted by slice group so that data for a slice group is stored in the same data buffer.

In block 620, a point at which one slice is completely encoded is determined (here, "completely encoded" means all macroblocks in the slice are encoded). In one embodiment, each time a slice is completely encoded, the corresponding link list is updated with the slice information. This information includes the macroblock ID of the first macroblock of the slice.

In block 630, at the point at which a slice is completely encoded and the corresponding link list updated, a counter associated with the data buffer that contains the encoded data is incremented.

In block 710 of FIG. 7, the beginning of a frame is identified. Once a slice in the frame has been encoded and that slice has been placed into a data buffer, an entry associated with the slice is added to the link list associated with that data buffer. The first link list entry, which may be referred to as the start-of-frame entry, is accessed by the frame assembler to identify the number of slice groups in the frame.

In block 720 of FIG. 7, the frame assembler checks link list availability for all valid slice groups. In other words, if there are three slice groups in the frame, for example, then the frame assembler determines whether each of the three corresponding link lists contains a valid entry, and hence whether each of the data buffers includes a completely encoded slice. This can be readily determined by checking the counter values associated with each data buffer/slice group/link list. In one embodiment, if each counter has a value other than its initial value (e.g., each counter is not zero), then there is at least one valid (completely encoded) slice per slice group or, equivalently, each data buffer contains at least one valid (completely encoded) slice; accordingly, the flowchart proceeds to block 730. Otherwise, the flowchart returns to block 720 until there is at least one valid slice per slice group.

In block 730, the leading (first or lowest) macroblock ID associated with each of the valid slices is compared in order to determine the order in which the slices in the subset of valid slices are to be placed in an access unit for the frame. In one embodiment, the link list entry for a particular slice identifies the lowest macroblock ID associated with that slice. As described above, the slice having the lowest macroblock ID associated therewith will be placed into the access unit before the other valid slices.

In block 740, the encoded data and link list entry for the slice identified in block 730 are read and placed into appropriate locations within the access unit. If the selected slice is the last slice in a respective slice group, then the link list associated with that slice group is invalidated—that link list is no longer available and is no longer checked by the frame assembler in block 720. Once all of the encoded data and link list entries have been read and appropriately packed in the access unit, then the frame assembly process is ended for the current frame (block 750) and the flowchart returns to block 710.

Note that, by intelligently allocating encoded data to the data buffers, the encoder may start encoding the next frame before the frame assembly process is completed. For example, the data buffers can be used to store encoded data for a second frame, even if data for the first frame is still present in the data buffers.

In summary, according to embodiments of the invention, slices can be encoded as if ASO is enabled; however, slices are not placed in an access unit or sent in arbitrary order. Instead, encoded slices are shuffled before they are placed in the access unit so that they will be received at a decoder in an orderly manner. As a result, decoding can be performed more efficiently, and decoder architectures and/or decoding processes can be simplified because they do not have to support ASO. More specifically, demands placed on the decoder memory are reduced because the decoders do not have to store slices of encoded data until other slices needed for decoding are available. Furthermore, the demands placed on the processing resources of decoders are reduced because decoders do not have to sort through stored slices and arrange them as needed for decoding.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented method of processing a frame comprising video data, the method comprising:
   accessing video data that is segregated into a plurality of macroblocks, the plurality of macroblocks segregated into a plurality of slices and the plurality of slices segregated into a plurality of slice groups, each of the macroblocks having a macroblock identifier (ID) associated therewith;
   identifying a first point while encoding the video data at which a subset comprising at least one slice from each of the slice groups has been encoded; and
   performing a comparison of macroblock IDs associated with slices in the subset to determine an order in which the slices in the subset are to be placed in an access unit for the frame, wherein the access unit is subsequently available to a decoding device.

2. The method of claim 1 further comprising:
   storing encoded macroblocks in a plurality of data buffers, wherein the encoded macroblocks are sorted by slice group so that members of a slice group are stored in a same data buffer; and
   performing the comparison when there is at least one slice in each of the data buffers.

3. The method of claim 1 further comprising:
   storing encoded macroblocks in the data buffers;
   each time a slice of a slice group is added to a data buffer, incrementing a counter associated with that slice group; and
   performing the comparison when each counter has a value other than its initial value.

4. The method of claim 1 further comprising:
   identifying a second point at which all slices in the frame have been encoded; and
   subsequent to the second point, comparing macroblock IDs associated with any remaining slices not yet placed in the access unit to determine an order in which the remaining slices are to be placed in the access unit.

5. The method of claim 1 further comprising:
   identifying how many slice groups are in the frame; and
   identifying the last slice encoded in each of the slice groups.

6. The method of claim 1 wherein the comparison comprises:
   identifying a slice in the subset having the lowest macroblock ID amongst the slices in the subset; and
   placing the slice having the lowest macroblock ID associated therewith in the access unit sequentially before other slices in the subset.

7. The method of claim 1 further comprising:
   storing encoded macroblocks in a plurality of data buffers, wherein the encoded macroblocks are sorted by slice group so that members of a slice group are stored in a same data buffer;
   storing the macroblock IDs for the encoded macroblocks in a plurality of link lists coupled to the data buffers; and
   accessing the link lists to perform the comparison.

8. The method of claim 1 wherein the encoding comprises H.264-compatible encoding and wherein the method further comprises disabling arbitrary slice ordering (ASO) during the encoding.

9. A system comprising:
   an encoder operable for accessing and encoding video data that is segregated into a plurality of macroblocks, the macroblocks segregated into a plurality of slices and the slices segregated into a plurality of slice groups, each of the slices having a macroblock identifier (ID) associated therewith, wherein encoded macroblocks are stored in a plurality of data buffers; and
   a frame assembler coupled to the encoder and operable for performing a comparison of macroblock IDs associated with slices in the data buffers to determine an order in which the slices in the data buffers are to be placed in an access unit for the frame, wherein the comparison is performed at points during the encoding when at least one slice in each of the slice groups has been encoded.

10. The system of claim 9 wherein the encoded macroblocks are sorted by slice group so that members of a slice group are stored in a same data buffer, wherein the comparison is performed when there is at least one slice in each of the data buffers.

11. The system of claim 9 wherein each of the data buffers has a respective counter associated therewith, wherein the counter associated with a data buffer is incremented each time a slice is added to that data buffer, and wherein the comparison is performed when each counter has a value other than its initial value.

12. The system of claim 9 wherein the comparison is also performed at a point at which all slices in the frame have been encoded.

13. The system of claim 9 wherein the comparison identifies which slice in the data buffers has the lowest macroblock ID amongst the slices in the data buffers, wherein the slice having the lowest macroblock ID is placed in the access unit before other slices in the data buffers are placed in the access unit.

14. The system of claim 9 wherein the macroblock IDs are stored in link lists in memory coupled to the encoder and frame assembler.

15. A computer-readable storage device having computer-executable instructions for performing a method of processing a frame comprising video data, the method comprising:
    identifying a number of slice groups in a frame of video data, the slice groups each comprising one or more slices, the slices each comprising one or more macroblocks, each of the slices having a macroblock identifier (ID) associated therewith;
    encoding the macroblocks;
    accumulating encoded macroblocks in a plurality of data buffers, wherein the encoded macroblocks are sorted by slice group so that members of a slice group are stored in a same data buffer; and
    at points during the encoding where the number of data buffers containing at least one slice of video data is equal to the number of slice groups, performing a comparison of macroblock IDs associated with slices in the data buffers to determine an order in which the slices in the data buffers are to be placed in an access unit for the frame.

16. The computer-readable storage device of claim 15 wherein the method further comprises:
    initializing a plurality of counters associated with the plurality of data buffers;
    each time a slice is added to a data buffer, incrementing the counter associated with that data buffer; and
    performing the comparison when each counter has a value other than its initial value.

17. The computer-readable storage device of claim 15 wherein the method further comprises:
    identifying a point at which all slices in the frame have been encoded; and
    subsequent to that point, comparing macroblock IDs associated with any remaining slices not yet placed in the access unit to determine an order in which the remaining slices are to be placed in the access unit.

18. The computer-readable storage device of claim 15 wherein the method further comprises:
    identifying how many slice groups are in the frame; and
    identifying the last slice encoded in each of the slice groups.

19. The computer-readable storage device of claim 15 wherein the comparison comprises:
    identifying a slice in the data buffers having the lowest macroblock ID amongst the slices in the subset; and
    placing the slice having the lowest macroblock ID associated therewith in the access unit before other slices in the data buffers are placed in the access unit.

20. The computer-readable storage device of claim 15 wherein the method further comprises:
    storing the macroblock IDs for the encoded macroblocks in a plurality of link lists coupled to the data buffers; and
    accessing the link lists to perform the comparison using the macroblock IDs stored in the link lists.

* * * * *